Patented Aug. 25, 1931

1,820,722

UNITED STATES PATENT OFFICE

CARL ZEMLIN, OF BERLIN-PANKOW, GERMANY, ASSIGNOR TO SIEMENS-BAUUNION, G. M. B. H. KOMMANDITGESELLSCHAFT, OF SIEMENSSTADT, NEAR BERLIN, GERMANY, A CORPORATION OF GERMANY

PROCESS OF SOLIDIFYING LAYERS OF GROUND AND SIMILAR MASSES

No Drawing. Application filed March 13, 1930, Serial No. 435,665, and in Germany April 17, 1929.

My invention relates to a process of solidifying layers of ground and similar masses.

It is frequently necessary to erect buildings or to construct underground structures on or in loose ground of insufficient carrying capacity and sometimes in water-bearing capacity and sometimes in water-bearing stratas, and many attempts have therefore been made to raise the carrying capacity of such ground artificially and to stop the inflow of water. The injection of cement which has been employed with good results for stopping or filling up cracks and fissures in comparatively solid rock has not proved successful in this case, due amongst other reasons to the fact that a filtering action is exerted on the injected milk of cement by the loose layers of ground. Greater success has been attained by the so-called chemical solidifying or consolidating processes which, however, generally assume a special condition of the ground. This known process is carried out by forcing two or more chemicals either in succession or after previous mixture into the ground in order that they should chemically react upon each other in the earth and form deposits or precipitates uniting the individual particles of the earth.

My invention consists of a greatly simplified chemical process of solidifying or consolidating ground. According to my invention the separate or common application of a number of chemicals is no longer necessary and the solidification of ground of any nature may be attained by introducing into the layers of ground or similar masses a single uniform chemical solution which by its reaction with substances already existing in the natural composition of the materials to be treated brings about the desired solidification or consolidation of the ground.

A suitable chemical solution may be found for every nature of ground. The chemical solution to be used according to my process is then so composed that by its reaction with the existing natural constituents of the earth the desired solidification is attained; in this manner the result aimed at may also be reached in such classes of ground in which the known solidification processes have up to now proved failures.

It may be pointed out that, for example in layers of ground which contain finely distributed quartz (sand) the solidfication is attained by merely introducing a preferably aqueous solution of hydrofluoric acid without the necessity of introducing into the ground either before or afterwards a second chemical solution.

In this case the hydrofluoric acid combines with the silicic acid (silica) liberated in the ground into silicon fluorite and water, according to the formula:

$$2H_2F_2 + SiO_2 = SiF_4 + 2H_2O.$$

The silicon fluorite soluble in water continues to act on the earth salts and acids. In this way silica is again set free and acts in statu nascendi on further $SiO_2$ and this process leads to the cementing together of the solid particles of the soil.

The reaction described takes place so effectively and thoroughly that even layers of ground containing comparatively small quantities of quartz are imparted a structure of sufficient carrying capacity and are able of keeping out water trying to force its way through.

It is obvious that by my improved process making use of a single uniform solution of chemicals the solidification or consolidation of the ground can be effected with simpler and less apparatus and tackle and by fewer workers in a shorter time, and that besides the excellent technical effect a progress is attained in economical respects over the hitherto known more complicated ground solidification or consolidation processes.

I claim as my invention:

1. The process of solidifying masses containing silica, which consists in introducing an aqueous solution of hydrofluoric acid.

2. The process of solidifying ground containing quartz, which consists in introducing an aqueous solution of hydrofluoric acid.

In testimony whereof I affix my signature.

CARL ZEMLIN.